United States Patent
Abrahamson et al.

(10) Patent No.: US 11,108,034 B2
(45) Date of Patent: Aug. 31, 2021

(54) LEAD-ACID BATTERY ELECTRODE INCLUDING CARBON FIBER MATERIAL WITH LOW SURFACE AREA

(71) Applicant: ArcActive Limited, Christchurch (NZ)

(72) Inventors: John Abrahamson, Christchurch (NZ); Grigory Isaac Titelman, Christchurch (NZ)

(73) Assignee: ARCACTIVE LIMITED, Christchurch (NZ)

( * ) Notice: Subject to any disclaimer, the term of this patent is extended or adjusted under 35 U.S.C. 154(b) by 0 days.

(21) Appl. No.: 15/766,451

(22) PCT Filed: Oct. 6, 2016

(86) PCT No.: PCT/IB2016/055973
§ 371 (c)(1),
(2) Date: Apr. 6, 2018

(87) PCT Pub. No.: WO2017/060837
PCT Pub. Date: Apr. 13, 2017

(65) Prior Publication Data
US 2019/0088931 A1    Mar. 21, 2019

(30) Foreign Application Priority Data

Oct. 6, 2015 (NZ) .................................. 713002
Dec. 10, 2015 (NZ) .................................. 715044

(51) Int. Cl.
*H01M 4/14* (2006.01)
*H01M 4/68* (2006.01)
(Continued)

(52) U.S. Cl.
CPC ............... *H01M 4/14* (2013.01); *H01M 4/20* (2013.01); *H01M 4/625* (2013.01); *H01M 4/627* (2013.01);
(Continued)

(58) Field of Classification Search
CPC ............ H01M 4/70; H01M 4/13; H01M 4/66; H01M 4/661; H01M 10/4235
(Continued)

(56) References Cited

U.S. PATENT DOCUMENTS 8,974,965 B2    3/2015  Hoshiba
2003/0008211 A1*  1/2003  Zeng .................... H01M 4/625
                                                        429/229
(Continued)

FOREIGN PATENT DOCUMENTS

CA    1281784 C  *  3/1991  ............. H01M 4/60
EP    0352115 A1 *  1/1990  ............. H01M 4/624
(Continued)

OTHER PUBLICATIONS

Dilute. Lexico.com Dictionary, Oxford University Press, https://www.lexico.com/en/definition/dilute, accessed Apr. 23, 2020 (Year: 2020).*

(Continued)

*Primary Examiner* — Sean P Cullen
(74) *Attorney, Agent, or Firm* — Dann, Dorfman, Herrell and Skillman, P.C.

(57) ABSTRACT

Lead-acid batteries with low water consumption and hydrogen gassing, comprise electrodes of a carbon fibre material having a surface area of less than 50 $m^2/g$. The carbon fibre material may also comprise non-carbon functional groups less than 22% by mass in the bulk fibre, and at least 78% carbon by mass in the bulk fibre. The carbon fibre material may be heated to a temperature of at least 1000° C. and cooled in an inert atmosphere to prevent non-carbon functional groups reforming on the carbonised carbon fibre material. The batteries are suitable for use in hybrid vehicles.

17 Claims, 7 Drawing Sheets

(51) Int. Cl.
  *H01M 10/06* (2006.01)
  *H01M 4/66* (2006.01)
  *H01M 4/62* (2006.01)
  *H01M 4/20* (2006.01)

(52) U.S. Cl.
  CPC ............ *H01M 4/663* (2013.01); *H01M 4/68* (2013.01); *H01M 10/06* (2013.01); *H01M 2220/20* (2013.01); *Y02E 60/10* (2013.01); *Y02T 10/70* (2013.01)

(58) Field of Classification Search
  USPC ................................................ 429/233, 245
  See application file for complete search history.

(56) References Cited

U.S. PATENT DOCUMENTS

| | | | |
|---|---|---|---|
| 2006/0019819 A1* | 1/2006 | Shao-Horn | .......... D01D 5/0038 502/4 |
| 2013/0004842 A1 | 1/2013 | Abrahamson | |
| 2014/0091033 A1* | 4/2014 | Kitano | .................. H01M 4/625 210/505 |
| 2014/0093775 A1 | 4/2014 | Hardman et al. | |
| 2015/0017545 A1 | 1/2015 | Christie et al. | |
| 2016/0185600 A1* | 6/2016 | Sotowa | .................. C01B 32/05 252/182.1 |

FOREIGN PATENT DOCUMENTS

| | | |
|---|---|---|
| WO | 2011078707 A1 | 6/2011 |
| WO | WO 2014/042542 A1 | 3/2014 |

OTHER PUBLICATIONS

Fernandez, M., "Review of Carbon studies within ALABC Projects," ALABC Project Ref 1315—SR1—Carbon, Advanced Lead-Acid Battery Consortium, Apr. 2014.

Birch, M.E. et al., "Properties that Influence the Specific Surface of Carbon Nanotubes and Nanofibers," Ann Occup Hyg., Nov. 2013, 57(9), pp. 1148-1166.

\* cited by examiner

LEAD-ACID BATTERY ELECTRODE INCLUDING CARBON FIBER MATERIAL WITH LOW SURFACE AREA

FIELD OF THE INVENTION

The invention relates to an improved electrode typically of carbon fibre for use in the manufacture or construction of lead-acid batteries particularly but not exclusively automotive batteries for hybrid vehicles.

BACKGROUND

Vehicle hybridisation driven by increasing worldwide demand for lower automotive emissions and/or increased fuel economy places increased demand on vehicle batteries, which are most commonly Pb-acid batteries. Overcharging a Pb-acid battery, including charging a Pb-acid battery at a rate of charge greater than the battery can accept, can lead to breaking down of water in the electrolyte to hydrogen and oxygen gas, consuming water in the electrolyte which in a closed battery cannot be replaced, permanently reducing the battery capacity. Overcharging also evolves hydrogen and oxygen gas (gassing) which is dangerous and for which venting from the battery is provided.

Hybrid and fully electric vehicles typically employ regenerative braking, in which when a braking force is applied by a generator (which here includes an alternator), the electric energy from which recharges the vehicle battery. Under regenerative braking relatively high charging currents may be generated and thus batteries for hybrid vehicles with regenerative braking should also have a high dynamic charge acceptance (DCA) rate, which refers to the rate at which a battery will accept charge. As companies began developing batteries with high DCA performance, it became apparent that improved DCA came at the expense of unacceptably high water consumption. By around the beginning of 2015, the requirement for a "high DCA" battery had morphed into a requirement for a "high DCA, low water consumption" battery. Additionally, these batteries must also meet the other automotive battery parameters of good cold cranking amps (CCA), high cycle life and good volumetric energy density (VED). In a Pb-acid battery DCA is primarily determined by the charging reaction at the negative electrode. Increased demands driven by the automotive industry for such batteries with increasingly low water consumption under demanding test conditions are being made.

Our international patent application publication WO2011/078707 discloses a lead-acid battery comprising as a current collector a conductive fibrous material of filaments with low interfibre spacing and conducting chains of Pb-based particles attached to the fibres, which provides improved battery performance particularly DCA.

SUMMARY OF INVENTION

It is an object of at least some embodiments of the invention to provide improved or at least alternative electrodes and/or cells and/or batteries particularly but not necessarily exclusively suitable for use in hybrid vehicles, and/or methods for manufacturing same.

In broad terms in one aspect the invention comprises a lead-acid battery or cell including at least one electrode comprising a carbon fibre material which has been heated to a temperature of at least 1000° C. and cooled in a substantially inert atmosphere to prevent non-carbon functional groups reforming on the carbonised carbon fibre material.

In at least some embodiments the carbon fibre material and/or carbon material in the active mass, has been heat treated to a temperature of at least 1050° C., or at least 1100° C. or at least 1200° C., or at least 1400° C. or least 1500° C. or at least 1600° C.

In at least some embodiments the carbon fibre material comprises a polyacrylonitrile (PAN) carbon fibre material, a rayon, phenol resin or pitch material.

In at least some embodiments the current collector carbon fibre material comprises at least 85%, or at least 90%, or at least 95%, or at least 97%, or at least 98% carbon by mass of the bulk fibre.

In broad terms in another aspect the invention comprises a lead-acid battery or cell including at least one electrode comprising a carbon fibre material having a surface area of less than 50 $m^2/g$.

In broad terms in another aspect the invention comprises a lead-acid battery or cell including at least one electrode comprising a carbon fibre material, wherein:
the carbon fibre material has a surface area of less than 50 $m^2/g$, and
non-carbon functional groups in the carbon fibre material comprise less than 22% by mass in the bulk fibre, and the carbon fibre material comprises at least 78% carbon by mass in the bulk fibre.

In at least some embodiments the carbon fibre material has a surface area of less than 30 $m^2/g$, or less than 20 $m^2/g$, or less than 10 $m^2/g$, or less than 5 $m^2/g$, or less than 3 $m^2/g$, or less than 1 $m^2/g$ (as determined by the BET method for example).

In at least some embodiments the non-carbon functional groups in carbon fibre material comprise less than 20% by mass in the bulk fibre or, less than 15% in the bulk fibre, or less than 10% in the bulk fibre, or less than 5% in the bulk fibre or less than 3% of the bulk fibre or less than 2% in the bulk fibre.

In at least some embodiments the carbon fibre material comprises at least 80%, or at least 85%, or at least 90% carbon by mass in the bulk fibre.

In at least some embodiments the metal impurities comprise less than 800 ppm, or less than 500 ppm, or less than 100 ppm, or less than 80 ppm, or less than 50 ppm, or less than 30 ppm, or less than 20 ppm. Undesirable metal impurities comprise for example, Fe, Co, Ni, Ag, Cu.

In at least some embodiments the areal density of the carbon fibre material is less than 500 $gm/m^2$, or less than 400 $gm/m^2$, or less than 300 $gm/m^2$, or less than 250 $gm/m^2$, or less than 200 $gm/m^2$, or less than 150 $gm/m^2$.

In broad terms in another aspect the invention comprises a lead-acid battery or cell including at least one electrode comprising as a current collector a carbon fibre material and/or carbon material in the active mass, which exhibits water consumption as indicated by battery or cell weight loss, of not more than 16 g/Ah when tested at 60° C.±2° C. over 21 days. In broad terms in another aspect the invention comprises a lead-acid battery or cell including at least one electrode comprising as a current collector a carbon fibre material having a minimum DCA acceptance of 0.6 A/Ah and a water consumption of not more than 16 g/Ah (when tested according to European standard EN50432-1:2015 Test 6.9). In at least some embodiments water consumption of a lead-acid battery or cell of the invention is not more than 8 g/Ah when tested at 60° C.±2° C. over 42 days, or is not more than 4 g/Ah when tested at 60±2° C. over 42 days, is not more than 3 g/Ah when tested at 60° C.±2° C. over 42 days, or is not more than 4 g/Ah when tested at 60° C.±2° C. over 84 days. In the alternative, in at least some embodiments the water consumption is not more than 300 mA, or is not more than 250 mA, or is not more than 200 mA, or is not more than 150 mA, or is not more than 100 mA, or is not more than 90 mA, where these values represent the average current for a 12V 60 Ah battery.

In at least some embodiments the carbon fibre material has impregnated therein an active material comprising a paste comprising Pb-based particles and a fluid such as water, a dilute acid such as for example sulphuric acid and water, and/or an alcohol. In some embodiments the alcohol is ethanol. In at least some embodiments the pasted carbon fibre material has a pasted density of between 1-5 g/cm$^3$, or between 2-5 g/cm$^3$, or between 2.5-4.5 gm/cm$^3$, or between 3.5-4.5 gm/cm$^3$, or between 3.8-4.2 gm/cm$^3$.

In at least some embodiments, cells and/or batteries comprising an electrode construction of the invention may have a combination of relatively high DCA (and/or may maintain DCA or a higher rate of DCA with an increasing number of charge-discharge cycles) and relatively low water consumption.

In broad terms in another aspect the invention comprises a method of treating a carbon fibre material to reduce non-carbon functional groups comprising heating the carbon fibre material to a temperature of at least 1000° C., or 1100° C., or 1200° C., or 1400° C. in the presence of a non reactive gas, followed by a cool down period to atmospheric temperature in the same gas.

The term "carbonisation" as used in this specification refers to increasing the proportion of carbon in the bulk mass of carbon fibre material that has been treated.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

BRIEF DESCRIPTION OF THE FIGURES

The invention is further described with reference to the accompanying figures by way of example wherein.

DETAILED DESCRIPTION OF PREFERRED EMBODIMENTS

Figure 1:
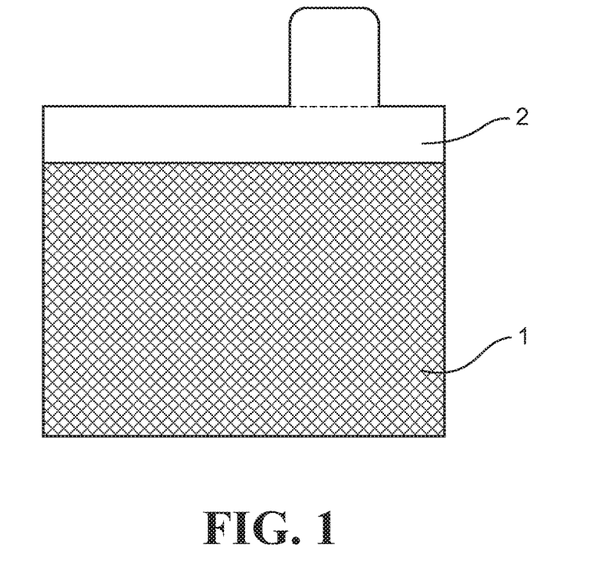
FIG. 1 shows an embodiment of a carbon fibre material electrode.
Figure 2:
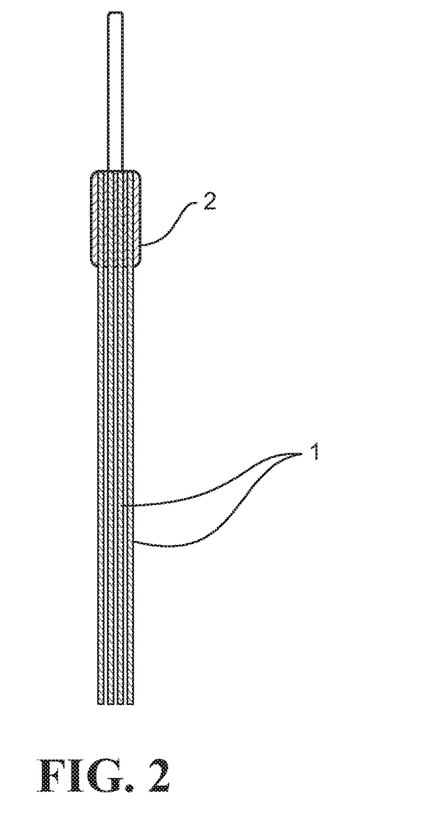
FIG. 2 is a schematic cross-section of an electrode comprising multiple layers of carbon fibre material.

FIG. 1 shows a section of a conductive fibre electrode such as of carbon fibre material 1, for a Pb-acid cell or battery, with one form of lug 2 for external connection of the electrode, formed on the fibre material. FIG. 2 is a schematic cross-section of a similar electrode comprising multiple layers 1 of fibre material, and a lug 2. Typically the lug is formed of metal such as Pb or a Pb alloy (herein both referred to inclusively as Pb) but may be formed of another material which electrically connects preferably by penetration into and/or between the fibrous material. Preferably substantially all or at least a majority of the fibres of the electrode material extend continuously across the electrode to the lug 2. The electrodes of FIGS. 1 and 2 are shown by way of example only.

It will appreciated that the electrode shown in FIG. 2 may also comprise a single layer of carbon fibre material that is then provided with a lug in accordance with that described above. Such a single layer of material may be woven or non-woven (such as for example felted, hydro-entangled, or needle punched), or knitted.

In accordance with an aspect of the invention the carbon fibre material 1 the current collector a carbon fibre material and/or carbon material in the active mass, has been heat treated to a temperature of at least 1000° C., 1100° C., 1200° C., 1400° C., 1500° C., or 1600° C. (referred to herein as carbonisation). This is effective to reduce non-carbon functional groups on the carbon fibre material to less than 22% by mass of the carbon fibre material so that the carbon fibre material comprises at least 78% carbon in the bulk fibre.

The carbon fibre material consists of nano-sized regions of graphitic sheets, with the regions linked together by non graphitic carbon. The top and bottom surfaces of the graphitic regions generally comprise aromatic C—C bonds (these do not contribute to gassing). On the edges of these sheets—these bonds are specific and allow the carbon to mate up with other non carbon chemical functional groups or moieties—namely nitrogen and oxygen groups which (we believe) contributes to gassing.

Figure 7:
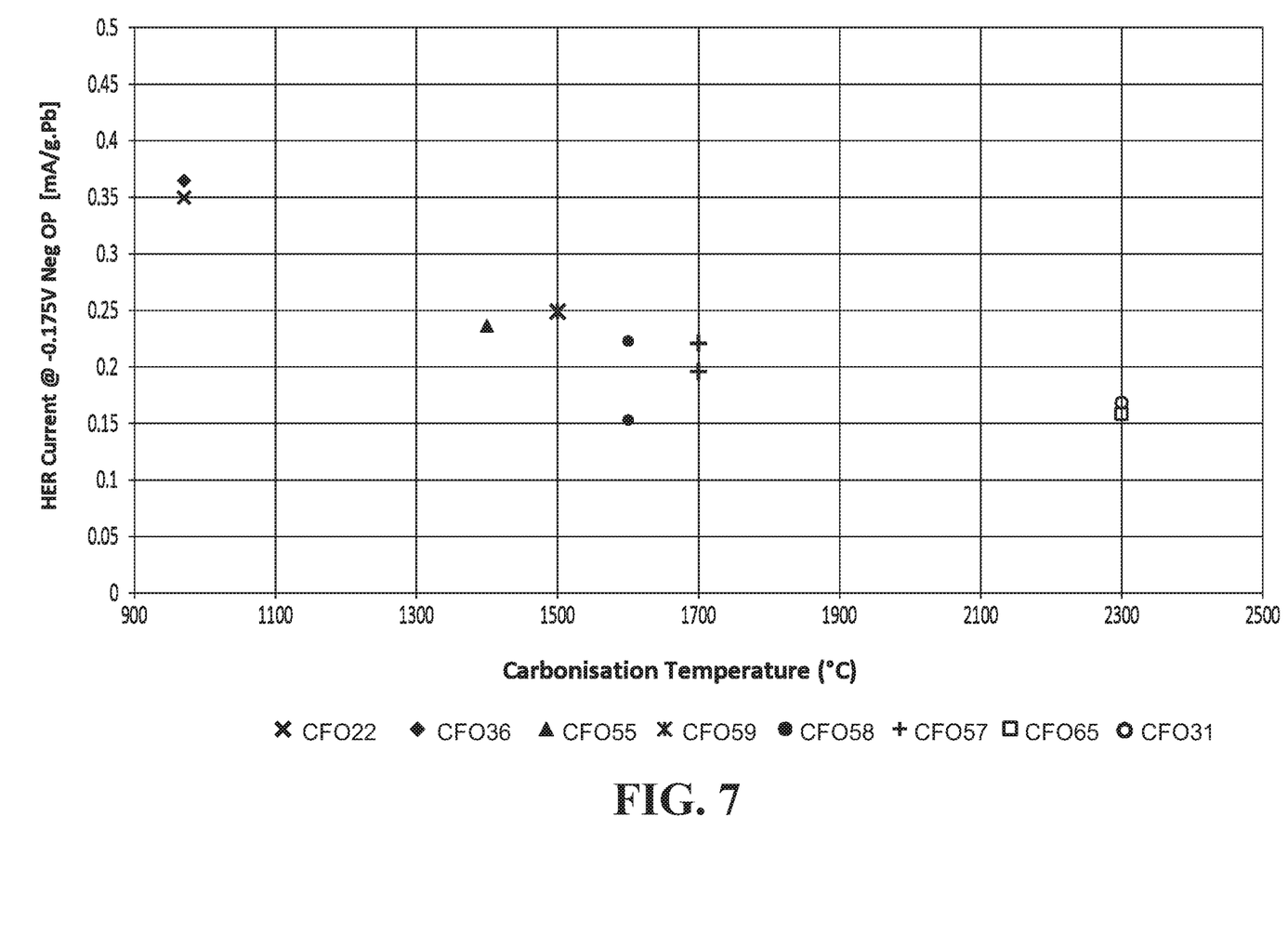
FIG. 7 is a water consumption plot for various pasted carbon fibre electrodes that have been built using carbon fibre materials treated at temperatures between 970° C. and approx., 2300° C. as referred to in Example 2 in the subsequent description of experimental work.

Removal of the non-carbon functional groups can be undertaken by a temperature controlled process in an inert atmosphere. The inert atmosphere ensures the carbon does not react with anything else. With reference to FIG. 7 and Table 1 below, the heat treatment minimises the edge groupings because (we believe) the high temp creates larger graphite sheets so the same mass of carbon remains but the carbon is now spread over a larger volume. Therefore there is a natural minimisation in the number of carbon edges/unit volume or unit area. This reduction of edge area can be measured using BET.

Figure 3:
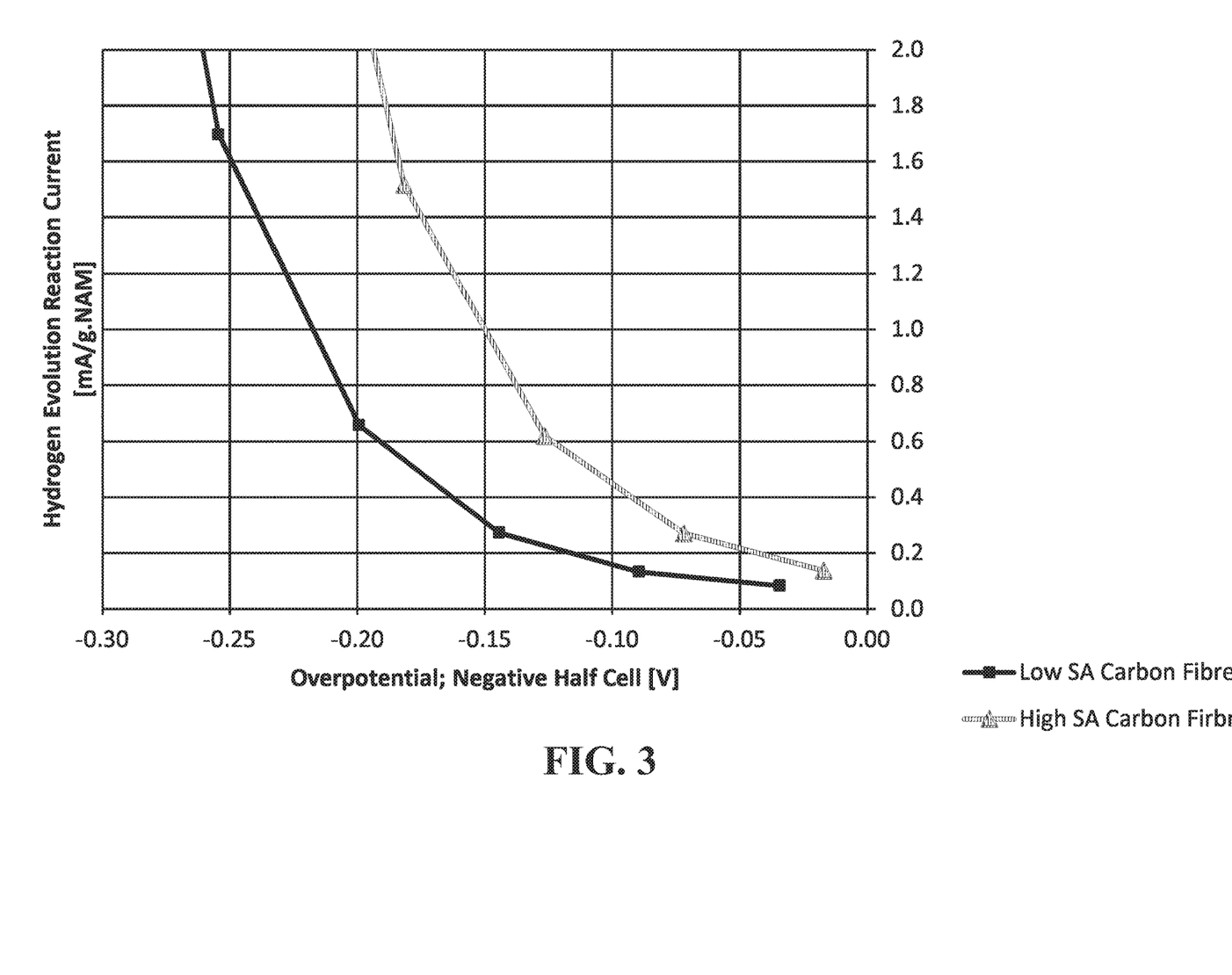
FIG. 3 shows a Tafel Plot of a low surface area carbon fibre electrode vs a high surface area carbon fibre electrode.
Figure 4:
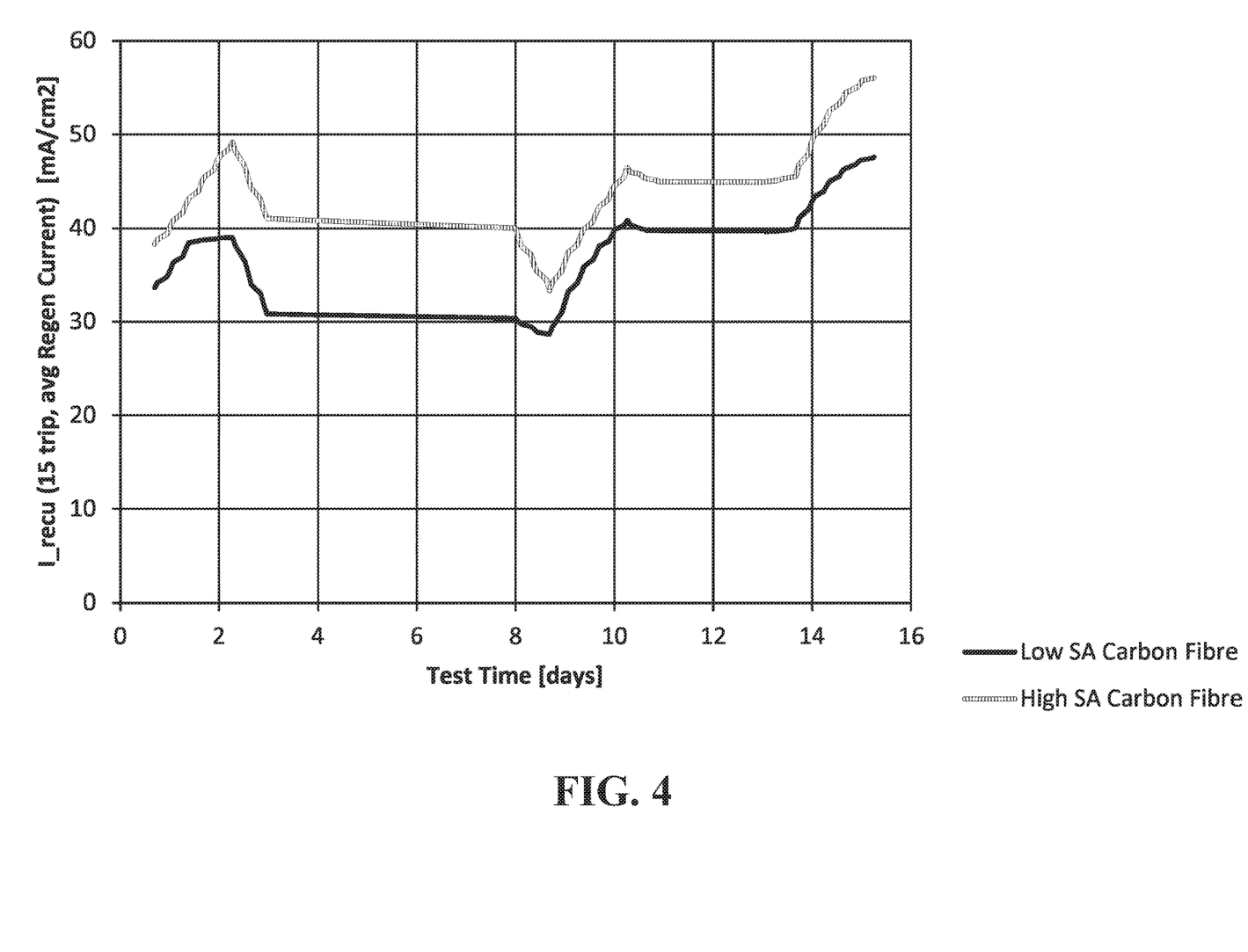
FIG. 4 shows the DCA performance of a low surface area carbon fibre electrode vs a high surface area carbon fibre electrode.
Figure 5:
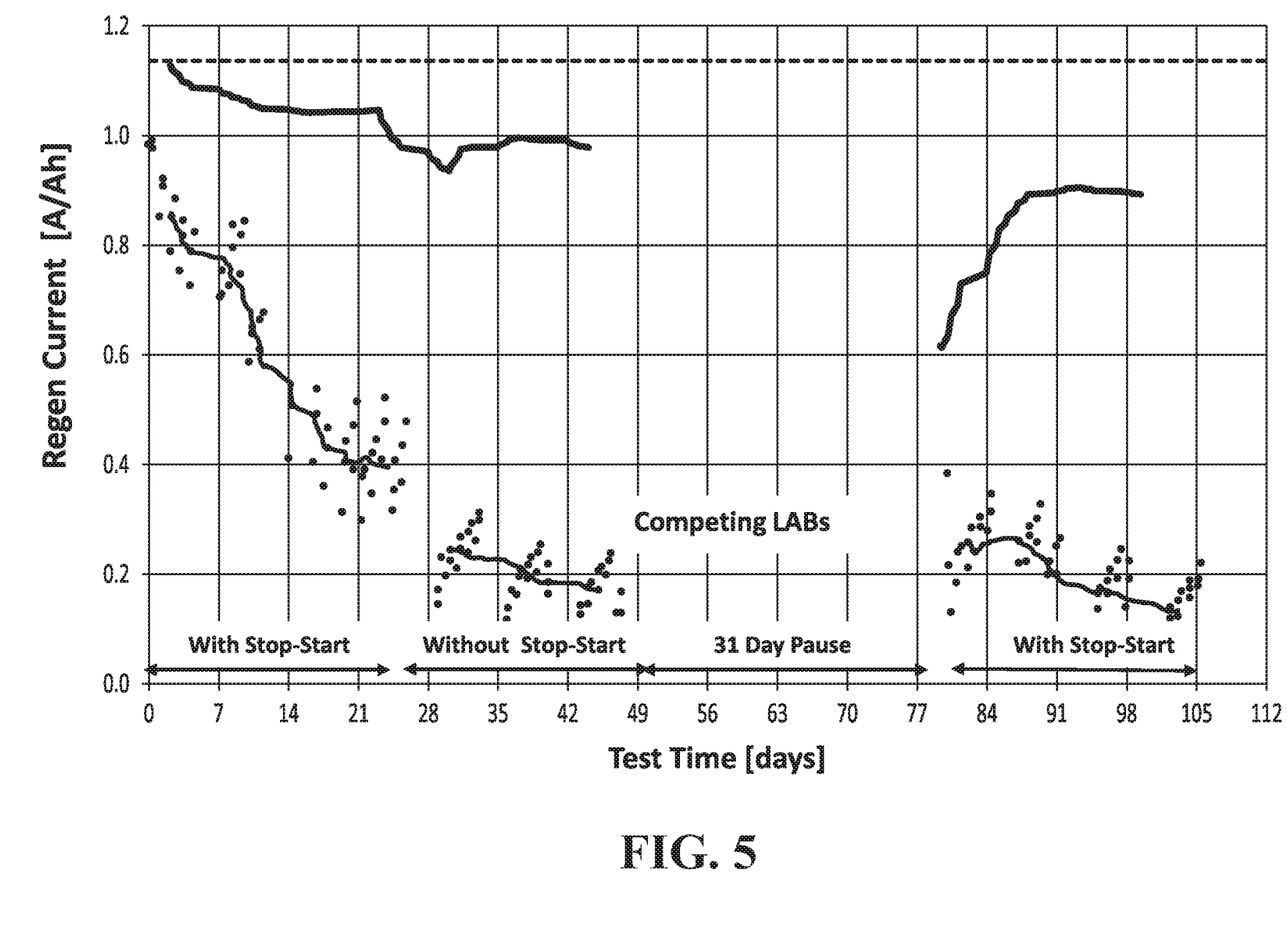
FIG. 5 shows the DCA performance of a full sized low surface area carbon fibre electrode vs that of traditional lead acid batteries currently on the market.

In accordance with another aspect the invention is a low surface area carbon fibre electrode, i.e., having a surface area of less than 50 m$^2$/g, that alone can reduce water consumption. FIG. 3 is a Tafel plot for a low surface area carbon fibre electrode vs a high surface area carbon fibre electrode. FIG. 4 shows the DCA performance of a low surface area carbon fibre electrode vs a high surface area carbon fibre electrode. FIG. 5 shows the DCA performance of a full sized low surface area carbon fibre electrode vs that of traditional lead acid batteries currently on the market.

In summary we have found that by forming the battery electrodes or at least the negative electrodes of carbon fibre material having a surface area of less than 50 m$^2$/g alone can decrease water consumption, and further that if the carbon fibre material has non-carbon functional groups on the current collector less than 22% as measured by the bulk fibre, the carbon fibre material comprises at least 78% carbon in the bulk fibre, thereby water consumption and gassing may be reduced without a significant reduction in DCA. For example a lead-acid battery can be produced which exhibits water consumption as indicated by battery or cell weight loss, of not more than 16 g/Ah or 8 g/Ah or 4 g/Ah when tested at 60° V±2° C. over 21 days for a weight loss <16 g/Ah or under the same conditions over 42 days for a weight loss <8 g/Ah or <4 g/Ah, and a minimum DCA acceptance of 0.6 A/Ah.

In at least some embodiments the carbon fibre material has impregnated therein an active material comprising a paste comprising Pb-based particles and a fluid such as water, an acid and/or alcohol. In some embodiments the acid is dilute sulphuric acid, being water and sulphuric acid. In some embodiments the alcohol is ethanol. In at least some embodiments the pasted carbon fibre material has a pasted density of between 1-5 g/cm$^3$, or between 2-5 g/cm$^3$, or between 2.5-4.5 gm/cm$^3$, or between 3.5-4.5 gm/cm$^3$, or between 3.8-4.2 gm/cm$^3$.

In at least some embodiments the carbon fibre material comprises a carbon fibre material comprising or derived from a rayon, polyacrylonitrile, phenol resin, or pitch material.

In at least some embodiments the carbon fibre material also has an average spacing between conductive fibres in the range about 0.5 to about 10 times or about 5 and about 10 times the average fibre diameter, or less than about 20 microns, or less than about 10 microns, and an average conductive fibre diameter of less than about 10 microns.

Typically the carbon fibre material has an average thickness less than about 5 mm or less than 3 mm or less than 2 mm, and a variation in thickness less than about 0.5 mm or less than about 0.2 mm, or alternatively a variation in thickness of less than about 20%.

In preferred embodiments the conductive current collecting material fibres are inherently conductive. In preferred embodiments the electrode fibres are carbon fibres.

Preferably the current collector material and the fibres thereof are flexible, which will assist in accommodating volume changes of the active material attached to the current collector material during battery cycling, and the microscale fibres may also reinforce the active material, both properties assisting to reduce breaking off ("shedding") of active material from the electrode in use.

The negative electrode or electrodes, the positive electrode or electrodes, or both, of a cell or battery may be formed as above.

In some embodiments the conductive fibrous material comprises the sole current collector of the electrode. Alternatively the electrode may comprise a metal grid also as a current collector in addition to the conductive fibrous material of carbon fibre. In preferred embodiments conductive fibrous material comprises a carbon fibre material and the metal grid comprises a lead grid. The carbon fibre layer(s) are conductively connected to the metal grid so that the grid receives current from the carbon fibre layer(s) and connects the electrode externally thereof.

The negative or positive or both electrodes of each cell may comprise a metal grid.

Where the electrode comprises a metal grid preferably at least 20% of the current generating active mass is dispersed through the conductive fibrous material. In preferred embodiments at least 40%, 50%, 80%, or more than 80% of the active mass is dispersed in the conductive fibrous material. Thus less than 80%, 60%, 50%, or 20% of the active mass may be dispersed in the metal grid (specifically, within its apertures).

In some embodiments at least 20% but not more than 40% of the active mass is dispersed through the conductive fibrous material.

In preferred embodiments the conductive fibrous material is present as multiple layers of one or more on either side of the metal grid. Alternatively the conductive fibrous material is present as a single layer on one side of the metal grid.

The metal grid may have a similar superficial surface area or be of similar height and width dimensions particularly in a major plane, to the conductive fibrous material element(s) but in alternative embodiments the metal grid may have smaller dimensions for example of smaller height and width dimensions, and may comprise for example a narrower lead strip between two larger carbon fibre layers on either side thereof.

Typically during battery or cell construction the current collector material is impregnated under pressure with the paste, which in a preferred form comprises a mixture of Pb and PbO particles of Pb and PbO and a fluid such as water, an acid such as for example dilute sulfuric acid, and/or an alcohol. In some embodiments the alcohol is ethanol. Alternatively the paste may comprise lead sulphate ($PbSO_4$) particles and a fluid such as water, an acid such as for example dilute sulphuric acid, and/or an alcohol. In some embodiments the paste at impregnation into the electrode comprises dilute sulphuric acid comprising between greater than 0% and about 5%, or between 0.25% and about 4%, or between 0.5% and about 4%, or between 0.5 and 3.5% by weight of the paste of sulphuric acid. The Pb-based particles may comprise milled or chemically formed particles which may have a mean size of 10 microns or less, small enough to fit easily into spaces between the fibres.

The paste may optionally also contain other additives such as barium sulphate, and/or an expander such as a lignosulphonate. Barium sulfate acts as a seed crystal for lead sulphate crystallisation, encouraging the lead to lead sulfate reaction. An expander helps prevents agglomeration of sulphate particles at the negative plate, for example forming a solid mass of lead sulfate during discharge into the carbon fibre material.

For example an expander may comprise between about 0.01% to about 0.25% or about 0.07% to 0.25%, or about 0.08% to 0.2%, or about 0.08 to 0.2% or about 0.08 to 0.15% by weight of the paste at impregnation. It has been found that the inclusion of an expander compound in the paste may have a beneficial effect on CCA performance but a negative effect on DCA performance. Conventionally an expander at a concentration of around 0.2% or more is added to the paste. It has been found that an expander concentration of between about 0.01% to about 0.15% by weight of the paste at impregnation then both good DCA and CCA performance can be achieved.

The paste may also comprise Ag, Bi, Zn, or a compound of any thereof as an anti-gassing agent.

The paste may have a sufficiently low shear strength to flow (slump) when placed in a cylindrical shape on a horizontal surface under gravity. A sufficient slump is seen for a noticeable slumping of a 30 mm high by 30 mm diameter cylinder, at impregnation into the electrode material. Preferably the paste has a creamy consistency. It has been found that this is achieved where the paste at impregnation into the electrode comprises (greater than 0 but) less than about 5% by weight of sulphuric acid. It has been found that where the acid content approaches 5% by weight, the paste viscosity increases.

A fluidiser may be added to the paste to ensure that the paste viscosity remains relatively low to facilitate continuous paste infiltration into the carbon material. A suitable fluidiser may for example be polyaspartic acid, added to the paste in the range from greater than 0 but less than about 5% by weight of the lead containing component of the paste. In other embodiments the polyaspartic acid may be between about 0.05% to about 4%, or between about 0.75% to about 3%, or between about 1% to about 2.5%. The fluidiser preferably should not adversely affect battery performance parameters particularly CCA, DCA, water consumption, and capacity. It has also been found useful when mixing the Pb-based particles, sulphuric acid, water and any optional additives to form the paste, to aid mixing by vibration of the paste during mixing.

During initial cell formation (first charge and discharge cycle during which active particle linkages form) after cell or battery construction, cell formation occurs first by building the conducting framework, taking up most of the Pb in the negative active material, building normally over lengths of several millimetres (connecting strings of perhaps a thousand or more micron sized particles end to end). This stage also produces small $PbSO_4$ particles. Second, these smaller particles attach to this conductive framework to provide and receive current.

In at least some embodiments the electrode comprises, when fully charged, voidage (being the fractional volume occupied by the pores between the lead and conductive fibres) of between about at least about 0.3, and a mass loading ratio of lead (in whatever form) to the mass of conductive fibres, when converted to volume ratio, in the range about 0.7:1 or about 1:1 to about 15:1 or about 10:1 (each over at least a major fraction of the electrode and more preferably over substantially all of the electrode). In at least some embodiments the voidage is between about 0.3 and about 0.9, about 0.3 and about 0.85, more preferably between about 0.3 and about 0.8, more preferably between about 0.5 and about 0.85, more preferably between about 0.6 and about 0.90, more preferably between about 0.65 and about 0.95, further preferably between about 0.7 and about 0.98. In at least some embodiments the volume loading ratio of the active material when converted to Pb to conductive fibres is between about 0.7:1 or about 1:1 and about 7:1, or about 1.5:1 and about 5:1, or about 2:1 and about 4:1. Typically the voidage may be present as corridors to form between the lead and carbon to enable lead particles to form between each of the carbon fibres.

In some embodiments electrodes of the invention whether composite (also incorporating a metal grid) or non-composite (without a metal grid) have a thickness (transverse to a length and width or in plane dimensions of the electrode) many times such as 10, 20, 50, or 100 times less than the or any in plane dimension of the electrode. The electrode thickness may be less than 5 or less than 3 mm for example. Each of the in plane length and width dimensions of the electrode may be greater than 50 or 100 mm for example. Such electrodes have a planar form with low thickness. One form of composite electrode of the invention may comprise a metal grid of thickness about 3.5 mm or less such as about 0.5 mm mm thick, with a carbon fibre layer of thickness about 2 mm or less such as about 0.3 mm thick on either side.

In preferred forms the electrode is substantially planar and has a dimension from a metal lug for external connection along at least one edge of the electrode less than 150 mm, or less than 120 mm, or less than 100 mm, or less than 70 mm, or less than 50 mm, or about 30 mm or less for example (with or without a macro-scale current collector). Alternatively such a planar form may be formed into a cylindrical electrode for example.

As stated, in preferred forms suitable for use in hybrid vehicles cells and/or batteries comprising an electrode construction of the invention may have both improved or relatively high DCA (measured by the Ford EU DCA test that has now been converted into a standard EU test being EN50432-6:2015 Test 7.3.10 for example) and low water consumption (measured in accordance with EN50432-1:2015 Test 6.9) and/or CCA (measured in accordance with the SAE J357 CCA test for example) and/or may maintain DCA or a higher rate of DCA with increasing number of charge-discharge cycles, and may also have improved or relatively high VED and/or improved battery life. Embodiments of cells or batteries of the invention may maintain DCA at least 70% or 80% or 90% of starting DCA (when first fully charged) after 5000 or 10000 cycles for example. The capacity of a battery is measured in Amp/hours, and utilisation is the actual battery capacity divided by the theoretical maximum capacity. In other embodiments of the invention the cells or batteries of the invention may have increased utilisation such as a utilisation of at least 55%, 60%, 70%, or 80% or over.

EXAMPLES

The following description of experimental work in which carbon fibre electrodes were constructed and tested for water consumption and DCA is given by way of example and further illustrates the invention.

Example 1

Electrode Construction

Pasted electrodes referred to subsequently in this example were constructed as follows: Paste was prepared using leady oxide, dilute sulphuric acid, and 0.1% by weight lignosulphonate as an expander, and <1 g of barium sulphate. The paste was mixed in an ultrasound bath to achieve an even consistency. Unpasted carbon fibre material, with areal density of approximately 200 g/m2, was then placed on the ultrasound plate, paste was then spread onto the carbon fibre, and then the ultrasound was turned on to vibrate the paste into the fabric for approximately ~1.5-2.0 min. The pasted electrode was turned over a couple of times while the ultra-sound was in operation until a smooth distribution of paste was observed where the majority of paste had penetrated into the fabric. The total amount of wet mass loaded into the electrode achieved a capacity (low current discharging) of approximately 14 Ah (i.e. approx., 62% of the theoretical capacity). The pasted electrode active area had dimensions length 140 mm, width 100 mm, and thickness between 2-2.5 mm. The achieved lead loading per volume (pasted density of the electrode based on the mass loaded into the electrode) was approx. 2.5-3 $g/cm^3$. At the fully charged state of the electrode, the Negative Active Mass (NAM) Pb to carbon volume ratio was around 4 to 6. The average spacing between carbon fibres was about 30 microns. The electrode was then air-dried for 24 hours at ambient temperature (18-24° C.). Where the pasted electrode were subsequently assembled in a cell, this contained electrolyte of 1.15 sg $H_2SO_4$ with one positive electrode on each side. The cell was left soaking for 24 hours at ambient temperature (18-24° C.) and standard cell formation was carried out.

The electrolyte was replaced with 1.28 sg $H_2SO_4$ and stabilised over one cycle of low current discharging (0.1 C) prior to being sent for DCA and water consumption testing.

Electrode Testing—Surface Area (BET), Water Consumption, and DCA—Tests:

A variety of tests were carried out on the carbon fibre fabric before pasting and on the pasted/formed electrodes described above. The test methods for Specific Surface Area, carbon vs non-carbon functional group content, water consumption, and DCA are given below:

Specific Surface Area:

The Specific Surface Area (SSA) of the carbon fibre samples was measured using the Brunauer-Emmett-Teller (BET) methodology (benzene analysis with 5 ppm benzene vapour in atmospheric pressure nitrogen at room temperature) to determine the amount of nitrogen that was absorbed.

Carbon Vs Non-Carbon Functional Group Content:

Samples of carbon fibre fabric were crushed into a powder, and then analysed via X-ray Photoelectron Spectroscopy (XPS). This determines the mass by percentage the carbon and non-carbon functional group content of the carbon fibre material as a bulk measurement.

Water Consumption Via Electrochemical Means, Tafel Method or European Automotive Battery Standard:

Samples of carbon fibre fabric were tested via electrochemical means as described below. Pending the outcome of the electrochemical test, the carbon fibre fabric underwent testing by the Tafel method. Here the carbon fabric is made into pasted electrodes as set out above and tested to obtain water consumption related values using the Tafel test current densities regime, by the standard Tafel test described in Fernandez, M., Atanassova, P., ALABC Project ref 1012M report no. 1, March-August 2011. Subject to the results of the Tafel testing, then some electrodes (carbon fibre fabric with Pb paste) were then further tested using the European Automotive Battery standard EN50432-1:2015, Test 6.9.

DCA:

Electrodes were tested for DCA according to the industry standard Ford EU DCA testing regime, the primary elements of which are now embodied in the EU test EN50432-6:2015 Test 7.3.10.

Testing Methods:

Formation of Electrodes.

Formation is the first time the electrochemically active materials experience a charging current/voltage, and for the negative electrode involves the conversion of the Leady Oxide pasted material into Pb. When electrodes are formed, the electrical charge initially converts the active material to Pb. Towards the end of formation, most, if not all, of the active material is Pb and any current still flowing is because water is being converted into $H_2$ and $O_2$. The "asymptotic current" at the end of formation is therefore a strong predictor of the likely water consumption outcome for the battery; the higher the asymptotic current, the higher the water consumption.

Evaluating the Water Consumption Tendency of the Carbon Fabric Via Electrochemical Testing:

This is a relatively quick test in which a higher the current as measured in mA/g indicates a likelihood of increased gassing. Samples of carbon fibre fabric were cut out and made into electrodes that had superficial surfaces of around 12 mm×12 mm (and were around 2 mm thick). The samples were submerged in sulphuric acid of SG 1.28. Each sample was pressed onto a copper shim and the contact area was completely covered with epoxy resin so that no electrolyte made contact with the copper. One sample electrode was placed opposite a counter electrode made of woven carbon fibres similarly connected to copper shim. A reference electrode of silver/silver sulphate was also placed within the area between the working and counter electrode. Acid of high grade (low metal impurities) suitable for battery production was used. The cell was held at a temperature of 25° C. and an overpotential of −150 mV with respect to the $Pb/PbSO_4$ electrode (−1.15 V vs the reference electrode) was applied to the felt electrode using a Gamry Interface 1000 potentiostat, as this overpotential is typically what is experienced by the negative electrode during water consumption testing at battery scale. The steady state current that resulted from the applied overpotential.

Carbon Felt/Lead Based Active Material Electrodes for Water Consumption—Tafel Test:

Tafel testing is used as a relatively quick method for determining the water consumption rate that will be achieved in a full battery. The advantage of this test is that useful data can be generated in less than one week. The full EN50432-1:2015 water consumption test, which is the actual standard against which the batteries will be assessed, can take up to 7 weeks to conduct. For the Tafel test, samples of carbon fibre/Pb electrodes were made as described in the Electrode construction section above, with dimensions of 140 mm×100 mm. Cells were constructed with one such CF/Pb negative electrode sandwiched between two commercially available automotive positive electrodes, with Daramic separators between each electrode surface. Also a silver/silver sulphate reference electrode was inserted in the cell. Acid of high grade suitable for battery production was used. The cells were connected to a testing machine (Arbin BT2000) and electrochemically formed. Tafel tests were done both at 25 and 60° C. A steady state current for an application of −170 mV (the typical overpotential experienced by the negative electrode during the EN50432-1:2015 water consumption test) was noted as the current generated at this overpotential is predictive of the water consumption that will be experienced. (The current generated by applying an overpotential to a fully charged lead acid battery is due to hydrolysis (converting $H_2O$ into $H_2$ at the negative electrode, and $O_2$ at the positive electrode, rather than faradaic reactions (converting $PbSO_4$ into Pb at the negative electrode). The larger the steady state current, the greater the amount of hydrolysis, and the higher the water consumption will be.

Water Consumption Via European Automotive Battery Standard, EN50432-1:2015:

60 Ah cells (being a typical capacity of a Micro Hybrid Battery) were constructed using seven negative electrodes made as described in the Electrode construction section above, sandwiched with 6 automotive positive electrodes with (Daramic) separators between the electrode surfaces. Cells containing negatives and positives suitable for a full sized battery were made as described above. These cells were formed, experienced other tests then placed into an incubator at 60° C. and recharged with a current of 1 A until the cell voltage reached 2.4 V. The voltage was held at 60°

C. and the current was recorded over time for the test duration of 42 days. Also every week the cell was removed briefly from the incubator, dried down on the outside and weighed.

The requirements for water consumption according to the European Standard (EN5042-1:2015) are set out below:—

| Requirement level | Test temperature | Duration (days) | Weight loss g/(Ah $C_e$) |
|---|---|---|---|
| W1 | +60° C. ± 2° C. | 21 | <24 |
| W2 | +60° C. ± 2° C. | 21 | <16 |
| W3 | +60° C. ± 2° C. | 42 | <8 |
| W4 | +60° C. ± 2° C. | 42 | <4 |
| W5 | +60° C. ± 2° C. | 84 | <4 |

Results:
The results are presented in table 1 below:

| Test | Electrode CF01 | Electrode CF02 | Electrode CF03 | Electrode CF04 | Electrode CF05 |
|---|---|---|---|---|---|
| Electrochemical Data (fabric only) mA/g | 1.56 | 4.2 | 6.88 | | 0.43 |
| Specific Surface Area via BET (m2/g) | 0.42 | 0.3 | 66 | 91.61 | 0.42 |
| Elemental Carbon as a % in the bulk fibre | 87 | 78 | 84 | | 97 |
| Non carbon content as a % in the bulk fibre | 13 | 22 | 16 | | 3 |
| Asymptotic Formation Current (mA) | 200 | 200 | 400 | | 100 |
| EN50432-1: 2015 Water Consumption (g/Ah) | | 7.0 | | | 3.4 |
| Tafel Current (mA/60 Ah battery) | | 203 | | | 130 |

Figure 6:
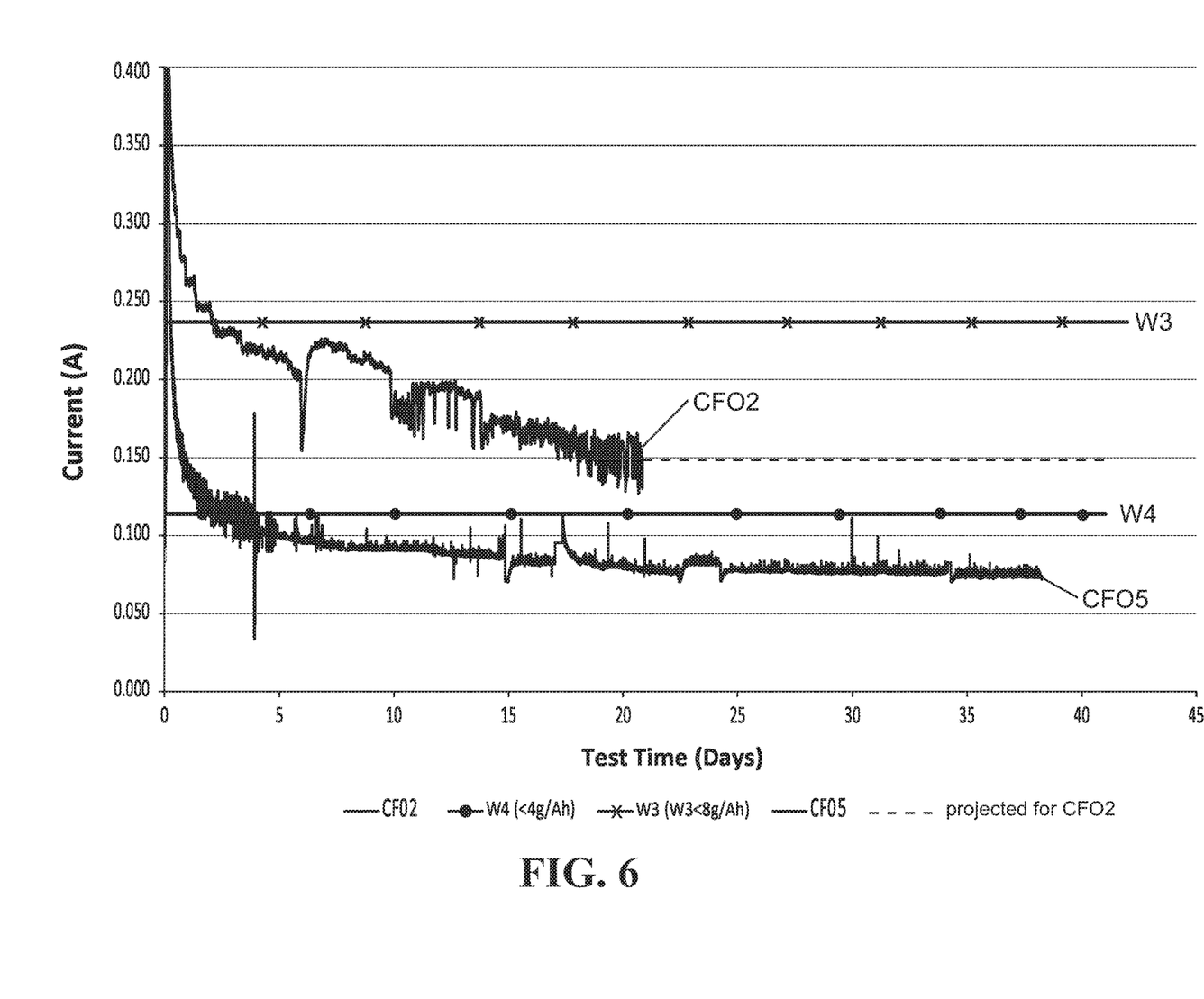
FIG. 6 is a water consumption plot for electrodes CF02 and CF05 referred to in Example 1 in the subsequent description of experimental work, with actual and projected data that can be used to determine water consumption in g/Ah with the reference standards W3 and W4 provided.

FIG. 6 is a water consumption plot for electrodes CF02 and CF05 with actual and projected data that can be used to determine water consumption in g/Ah with the reference standards W3 and W4 provided. FIG. 6 shows the current that is generated by applying a constant voltage of 2.4V for the duration of the test, as described above. As the battery is fully charged before the test begins, any current flowing is due to the conversion of $H_2O$ into $H_2$ and $O_2$ i.e. due to hydrolysis. The higher the current, therefore, the higher the water consumption. To achieve the W4 water consumption standard mentioned above, the average current flowing over 42 days needs to be 119 mA or less. To achieve the W3 standard, the average current over the 42 days is 237 mA or less.

Conclusions

Electrodes CF01, CF02 and CF05 having a combination of BET levels below 50 m2/g, levels of elemental carbon in the bulk fibre ≥78% with ≤22% non carbon content in the bulk fibre, exhibited the lowest water consumption data. This is further illustrated with reference to FIG. 6 that shows the projected and actual water consumption data for electrodes CF02 and CF05. For electrode CF02 both actual and projected water consumption of 7 g/Ah (calculated as an average area under the curve) where the W3 line runs at 8 g/Ah that correlates to a current of 237 mA (representing the asymptotic current). For electrode CF05 projected water consumption of 3.4 g/Ah at 42 days where the W4 line runs at 4 g/Ah that correlates to a current of 119 mA. DCA is maintained above the traditional lead grid lead acid battery value of 0.6 A/Ah.

Example 2

Electrode Testing—Temperature of Carbonisation
Method:
Samples of carbon fibre felt that were treated at the temperatures indicated on the x-axis of FIGS. 7 and 8 were obtained and cut to 140 mm length by 100 m width. The electrodes were pasted as described in Example 1 and then underwent water consumption testing in accordance with the methods described in Example 1. Again the water testing was carried out at 25° C. with a steady state current over potential of −170 mV.

Figure 8:
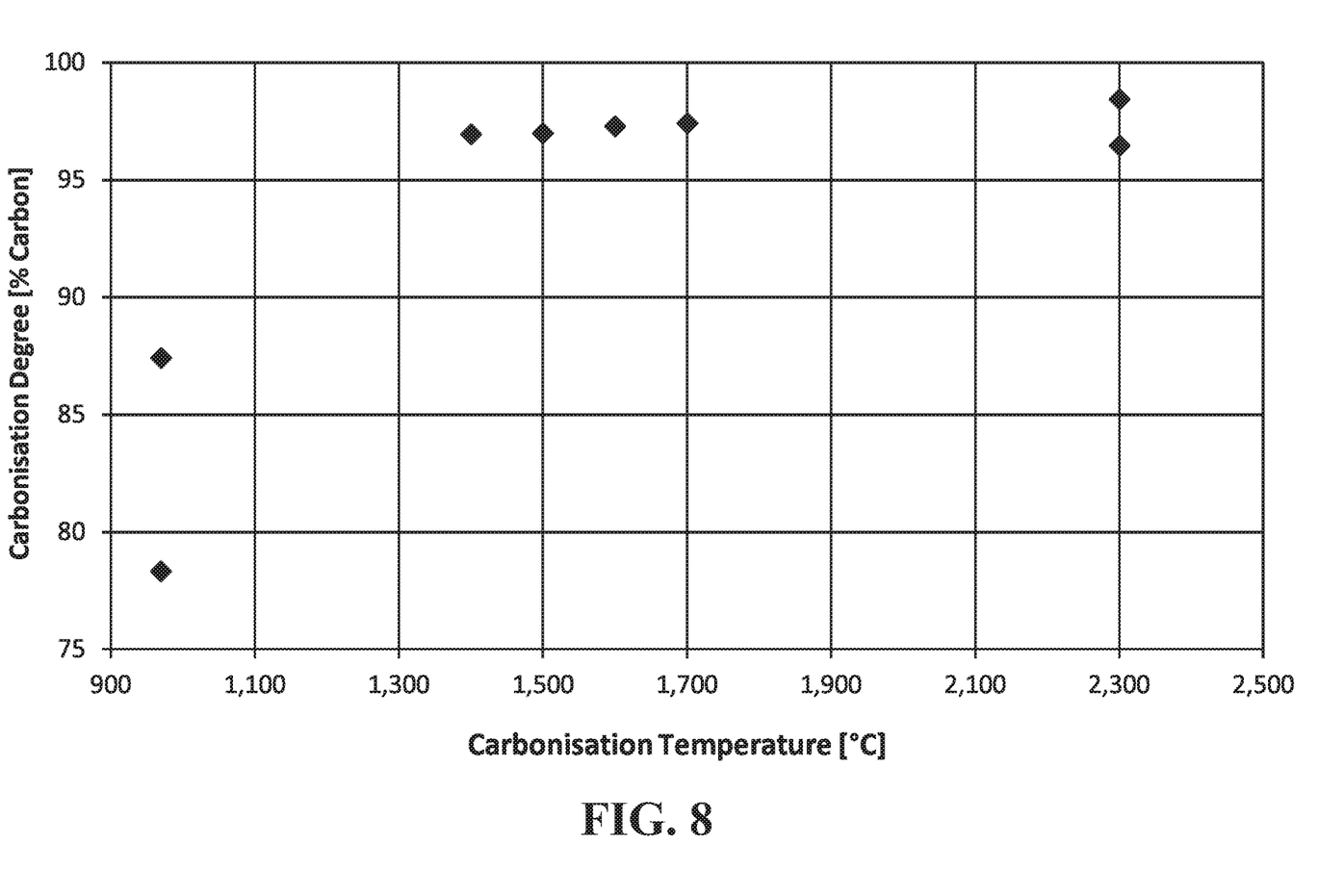
FIG. 8 is a plot of carbonisation versus temperature for the carbon fibre materials subsequently used to form the electrodes as set out in the Examples.

FIG. 7 is a water consumption plot for various pasted carbon fibre electrodes made from carbon fibre materials that have been treated at varying temperature ranges starting from 970° C. to approx., 2300° C. with the SSA of each carbon fibre material included. FIG. 8 is a plot of carbonisation versus temperature for the carbon fibre materials. Carbonisation temperature is an important parameter as the higher the carbonisation temperature, the higher the Carbon content (bulk measurement) and the lower the non-Carbon content. Hence, the higher the carbonisation temperature, the lower the non-Carbon content and the lower the observed gassing rate.

Conclusions

As FIG. 4 shows, a trend of decreased water consumption as the temperature of carbonisation increases was found. FIG. 4 shows the Hydrogen Evolution Current (HER) which is the stable current that is observed from pasted electrodes that are subjected to a charging overpotential for the negative electrode of 170 mV, a typical overpotential for batteries in Micro Hybrid Vehicles. From FIG. 7 it can be seen that there is a trend for those electrodes carbonised at a temperature at or above 1400° C. are likely to produce a battery product having a water consumption of 3 g/Ah. This is indicated by a water consumption of approximately 0.25 mA/g·Pb.

The invention claimed is:
1. A lead-acid battery or cell including at least one electrode comprising
a carbon fibre fabric having a surface area of less than 5 m$^2$/g, an areal density of less than 500 g/m$^2$, and wherein non-carbon functional groups in the carbon fibre fabric comprise not more than 20% by mass of the bulk fibre and the carbon fibre fabric comprises at least 80% carbon by mass in the bulk fibre, the carbon fibre fabric having impregnated therein an active material comprising Pb-based particles.

2. A lead-acid battery or cell according to claim 1 wherein said surface area of the carbon fibre fabric is less than 3 $m^2/g$.

3. A lead-acid battery or cell according to claim 1 wherein said surface area of the carbon fibre fabric is less than 1 $m^2/g$.

4. A lead-acid battery or cell according to claim 1 wherein said areal density of the carbon fibre fabric is less than 300 $gm/m^2$.

5. A lead-acid battery or cell according to claim 1 wherein said non-carbon functional groups on the carbon fibre fabric comprise less than 15% by mass of the bulk fibre and the carbon fibre fabric comprises at least 85% carbon by mass in the bulk fibre when analysed via X-ray Photoelectron Spectroscopy.

6. A lead-acid battery or cell according to claim 1 wherein said non-carbon functional groups on the carbon fibre fabric comprise less than 10% by mass of the bulk fibre and the carbon fibre fabric comprises at least 90% carbon by mass in the bulk fibre when analysed via X-ray Photoelectron Spectroscopy.

7. A lead-acid battery or cell according to claim 1 wherein said non-carbon functional groups on the carbon fibre fabric comprise less than 5% by mass of the bulk fibre and the carbon fibre fabric comprises at least 95% carbon by mass in the bulk fibre when analysed via X-ray Photoelectron Spectroscopy.

8. A lead-acid battery or cell according to claim 1, in which the carbon fibre fabric has been heat treated to a temperature of at least 1050° C.

9. A lead-acid battery or cell according to claim 1 wherein the carbon fibre fabric comprises or is derived from a polyacrylonitrile material, or is derived from a rayon, phenol resin, or pitch material.

10. A lead-acid battery or cell according to claim 1 wherein the carbon fibre fabric comprises metal impurities less than 800 ppm.

11. A lead-acid battery or cell according to claim 1 wherein the at least one electrode has a pasted density of between 1-5 $g/cm^3$.

12. A lead-acid battery or cell according to claim 1 wherein the electrode comprises a metal lug for external connection along at least one edge of the electrode.

13. A lead-acid battery or cell according to claim 1 comprising an expander in combination with the active material.

14. A lead-acid battery or cell according to claim 1 which exhibits water consumption as indicated by battery or cell weight loss, of not more than 16 g/AH when tested at 60° C.+/−2 C over 21 days.

15. A lead-acid battery or cell according to claim 1 having a minimum DCA acceptance of 0.6 A/Ah and a water consumption of not more than 8 g/Ah.

16. A hybrid or full electric automotive vehicle comprising a battery according to claim 1.

17. A hybrid automotive vehicle according to claim 16 which has stop-start functionality, regenerative braking functionality, and/or wherein the battery carries accessory loads when an engine of the hybrid automotive vehicle is off.

* * * * *